United States Patent

Lafleur

[15] 3,696,884
[45] Oct. 10, 1972

[54] METHODS AND APPARATUS FOR ACOUSTIC LOGGING IN CASED WELL BORES

[72] Inventor: Clovis L. Lafleur, Houston, Tex.

[73] Assignee: Schlumberger Technology Corporation, New York, N.Y.

[22] Filed: Dec. 29, 1969

[21] Appl. No.: 888,694

[52] U.S. Cl. .......181/5 BI, 181/.5 AC, 340/15.5 DP, 340/15.5 TM, 340/15.5 TI
[51] Int. Cl. ...............................................G01v 1/34
[58] Field of Search .340/15.5 TM, 15.5 BH, 15.5 TI; 181/.5 AC, .5 BI

[56] References Cited

UNITED STATES PATENTS

| 3,311,876 | 3/1967 | Lee | 340/18 |
|---|---|---|---|
| 3,424,268 | 1/1969 | Vogel | 181/.5 |
| 3,284,766 | 11/1966 | Sterry | 340/15.5 |
| 3,329,931 | 7/1967 | Tangvy | 340/18 |

Primary Examiner—Benjamin A. Borchelt
Assistant Examiner—N. Moskowitz
Attorney—Leonard R. Fellen, Donald H. Fidler, Stewart F. Moore, Jerry M. Presson, Edward M. Roney, William R. Sherman and John P. Sinnott

[57] ABSTRACT

In accordance with illustrative embodiments of the present invention, techniques are disclosed for providing well logging information which is especially suitable for the evaluation of cased well bores. More particularly, a well logging tool has two acoustic receivers spaced apart from a repetitively energized acoustic transmitter. The amplitude of a selected portion of each electrical signal produced by the receiver nearest the transmitter in response to the emitted energy and the time for such energy to travel to this near receiver is measured to produce logs of the travel time to this near receiver and the bonding of the casing to the cement which surrounds it. The electrical signals produced by the receiver farthest from the transmitter are used to produce a variable density log which can be used in conjunction with the cement bond log to evaluate the bonding of the cement to both the casing and formations. The travel time log can be used to evaluate the accuracy of the other two logs.

7 Claims, 8 Drawing Figures

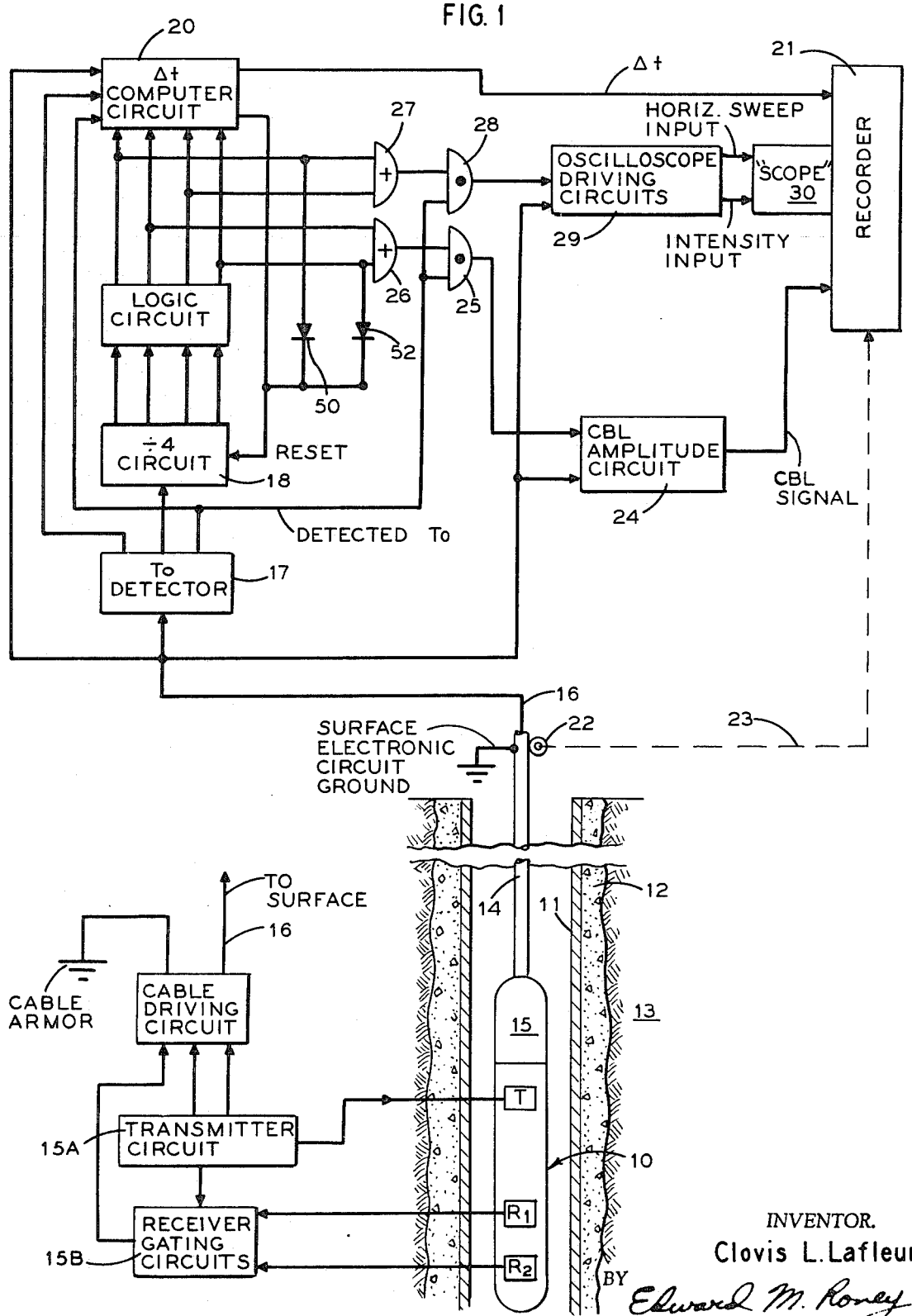

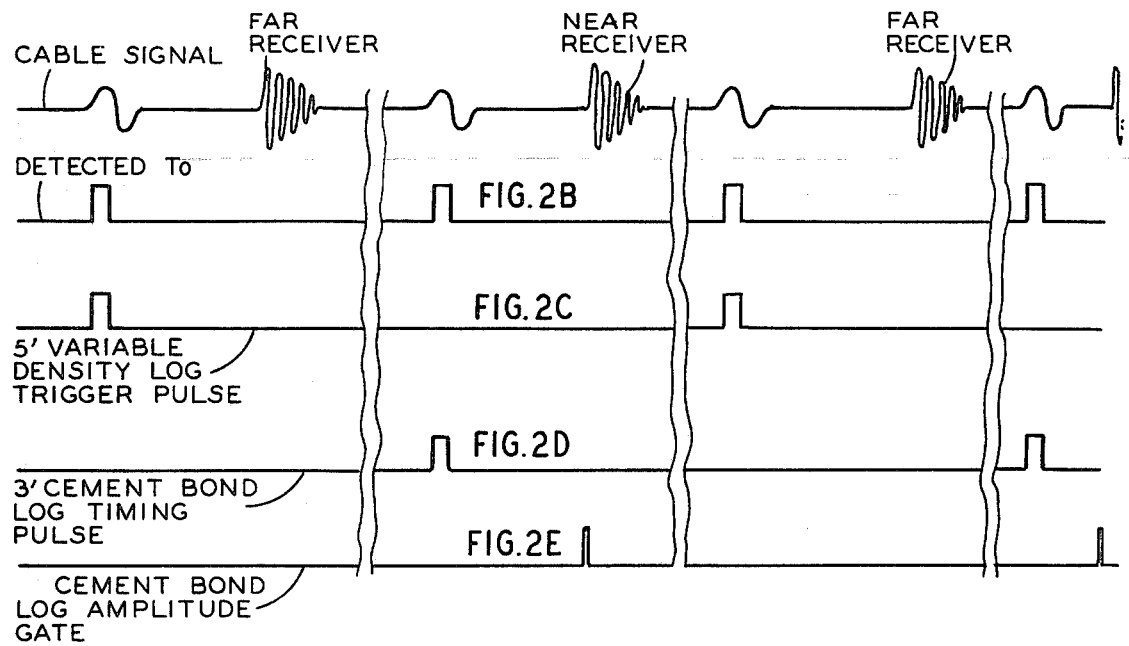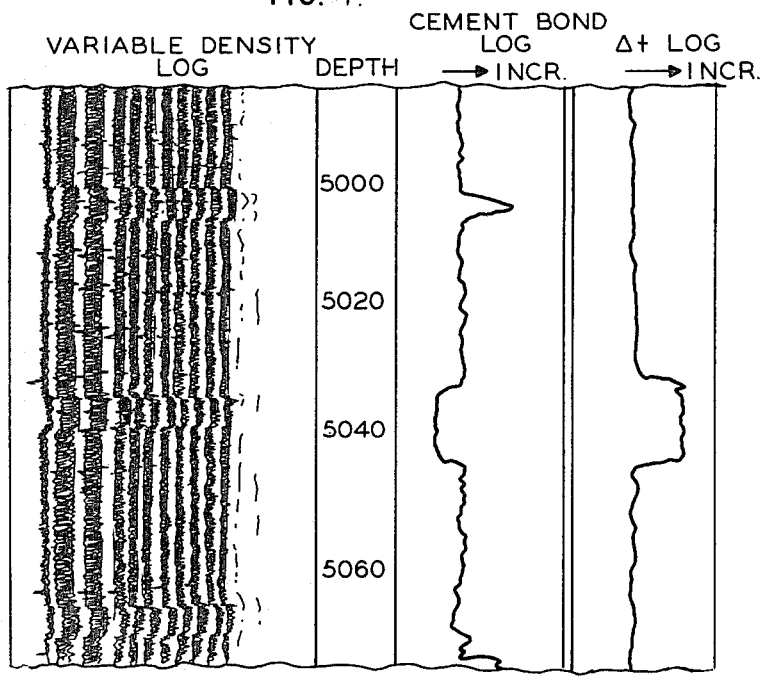

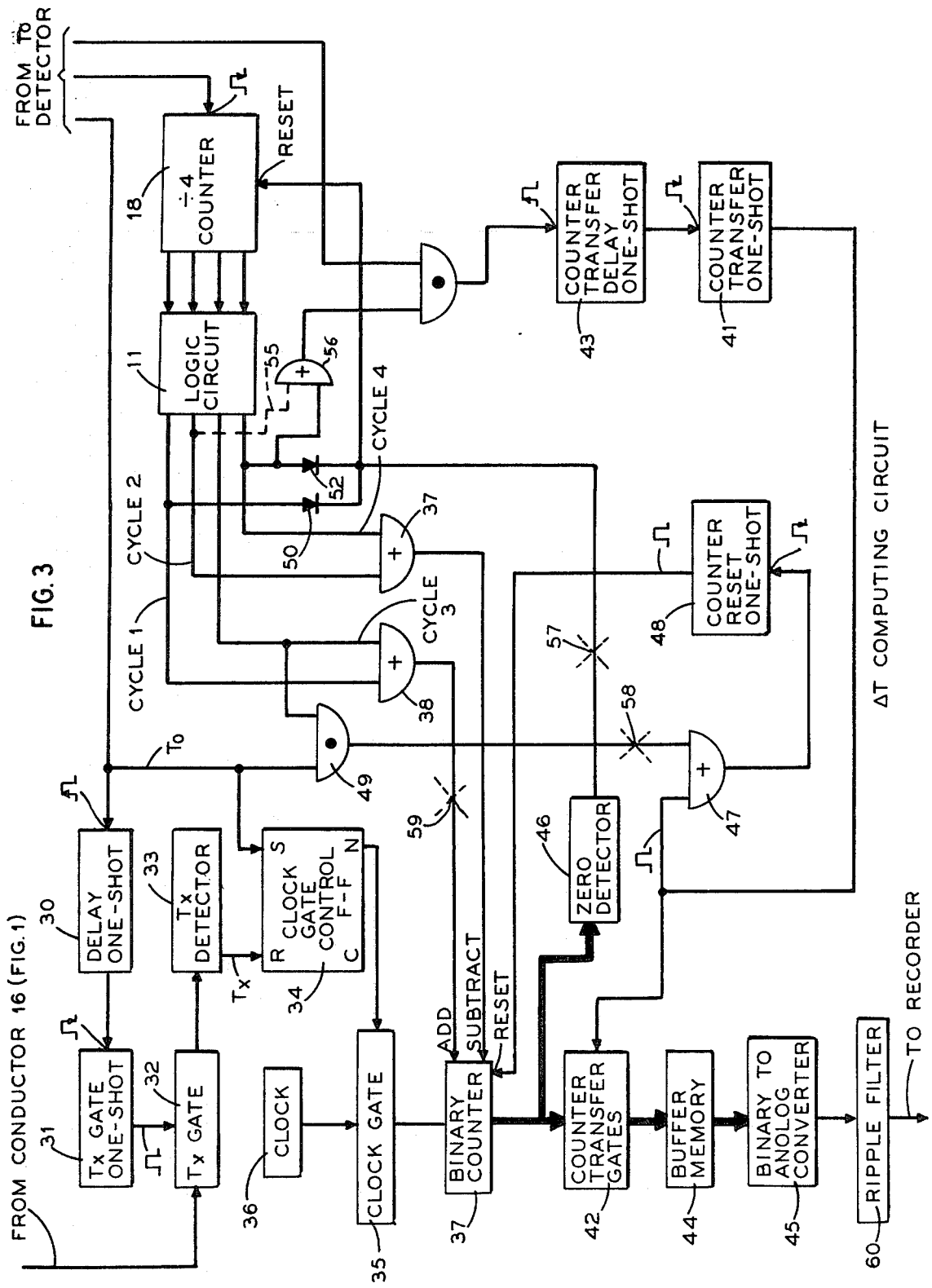

METHODS AND APPARATUS FOR ACOUSTIC LOGGING IN CASED WELL BORES

The present invention relates to acoustic logging methods and apparatus for use in well bores and, more particularly, to acoustic apparatus for investigating the nature of acoustic coupling between a casing and materials disposed to the exterior of the casing.

In a typical well completion operation, a casing is positioned in the borehole and cement is pumped into the annulus defined between the casing and borehole. For various reasons the cement may fail to completely fill the annulus along the length of the casing, which often results in a condition generally known as "channeling". Moreover, portions of the column of cement may fail to bond to the casing or formations. In such instances, fluid and/or gases of formations at other depth levels may migrate along the imperfections in this column of cement. Thus, if a production sand is completed as by perforation in a zone which includes such imperfections, fluids or gases from other formations may impair the production of hydrocarbons from the sand.

One way in which the nature of the material adjacent to the casing can be investigated is to measure the acoustic coupling of the casing and the materials adjacent thereto as set forth in U. S. Pat. No. 3,340,955 granted to Lee H. Gollwitzer on Sept. 12, 1967. This acoustic coupling can be measured by measuring the first half cycle of the acoustic energy received by an acoustic receiver spaced apart from a nearby acoustic transmitter upon energization of the transmitter. The amplitude of this first arrival is indicative of the amount of casing pipe circumference bonded to the cement.

Another manner in which cement bonding may be investigated is to produce a so-called "variable density log". Such a log is typically produced by sweeping an electron beam across the face of an oscilloscope and modulating the beam intensity with the received acoustic energy signal waveform while moving a film past the scope face. However, a variable density log alone does not give all of the answers either since it does not give a quantitive measure of cement bonding, as does the cement bond log. In present practice, cement bond and variable density logs are obtained on separate runs into the well bore thus giving the usual correlation problems associated with separate runs. However, a system has been devised for simultaneously making cement bond and variable density logs with one system. Such a system is shown in copending application Ser. No. 888,695 (15.21) filed on Dec. 29, 1969 by Victor Grijalva.

When investigating the media forming a cased well bore, it is important that the well tool be substantially centered in the well bore. The reason for this concerns the length which acoustic energy must travel between the acoustic transmitter and receiver and maximum amplitude of first arrival. The time for acoustic energy to travel through casing to the receiver is known thus enabling a gate to be opened at the appropriate time to measure the first energy arrival at the receiver. The time and amplitude is determined for the case of a centered well tool. If the well tool is eccentric in the well bore, the energy emitted from one side of the tool will have a shorter path to and from the casing thus causing the casing arrival at the receiver to be sooner than expected and the amplitude to be less than expected. Thus, the above-mentioned gate will not be time centered and the casing arrival amplitude will be lower, causing possible errors in the cement bond log.

It is therefore an object of the present invention to provide methods and apparatus for determining if a well tool is eccentric in a well bore.

It is another object of the present invention to provide methods and apparatus for simultaneously producing cement bond and variable density logs and a log representative of the validity of these logs.

In accordance with the present invention, systems and methods for investigating the media forming a cased well bore comprises moving a well tool having at least one acoustic transmitter and at least two spaced apart acoustic receivers through a borehole. The acoustic transmitter is repetitively energized to emit energy into the media surrounding the well tool and a timing pulse representative of the time of energization is produced. At least a portion of the energy is received by the acoustic receivers which produce electrical signals representative thereof. The amplitude of each first arrival of the signal produced by the receiver nearest the transmitter is measured to produce an output signal representative of the bonding between the casing and cement surrounding said casing and this output signal is recorded to produce a log indicative of the bonding between the casing and cement. Furthermore, selected timing pulses and selected signals produced by the receiver farthest from the transmitter are used to produce a variable density record of the signals produced by the farthest receiver and selected timing pulses and selected signals produced by the receiver nearest the transmitter are used to measure the travel time between the transmitter and near receiver to produce an output signal representative of this travel time for recording.

For a better understanding of the present invention, together with other and further objects thereof, reference is had to the following description taken in connection with the accompanying drawings, the scope of the invention being pointed out in the appended claims.

Referring to the drawings:

FIG. 1 is a schematic diagram of an acoustic logging system constructed in accordance with the present invention;

FIGS. 2A–2E show waveforms for various signals found in the circuitry of FIG. 1;

FIG. 3 is a schematic diagram of the $\Delta t$ computer circuit of FIG. 1; and

FIG. 4 is an example of logs produced by the FIG. 1 system.

Referring now to FIG. 1, an acoustic well logging tool 10 is located in a well bore which comprises a casing 11 and cement 12 adjacent to earth formations 13. The well tool 10 is supported in the well bore by, in this example, an armored monoconductor cable 14 which is reeled in and out of the well bore at the surface of the earth by a suitable drum and winch mechanism (not shown).

The well tool 10 includes an acoustic transmitter T and two spaced apart acoustic receivers $R_1$ and $R_2$. The well tool 10 also includes a fluid tight pressure resistant electrical housing unit 15 which contains electrical circuitry utilized in energizing the transmitter T and processing the signals produced by the receivers $R_1$ and $R_2$ for transmission to the surface of the earth. Within the housing 15, a transmitter circuit 15A repetitively energizes the acoustic transmitter T which emits acoustic energy into the media surrounding the well tool 10. This energy propogates to the acoustic receivers $R_1$ and $R_2$ and causes them to produce electrical signals. Under control of the transmitter circuit 15A, receiver gating circuits 15B operate to pass the signals produced by the receivers $R_1$ and $R_2$ on successive cycles of operation where one cycle includes one emission of energy. The transmitter circuit 15A generates sync pulses which indicate the time at which the transmitter T is fired as well as which receiver signal has been gated by the circuits 15B. The selected receiver signal and the sync pulses are applied to a cable driving circuit 15C for application to the surface of the earth. For a more detailed explanation of this circuitry, see copending application Ser. No. 846,907 (20.1771) filed by Geary L. Leger on Aug. 1, 1969. As set forth in this copending Leger application, the signals are transmitted to the surface in a four cycle mode with the far receiver $R_2$ signal being transmitted during cycles 1 and 3 and the near receiver $R_1$ signal being transmitted during cycles 2 and 4. A waveform example of the signals transmitted during the four cycles of operation is shown in FIG. 2A.

At the surface of the earth, the transmitted electrical signals are applied to a "$t_o$ detector" 17 which operates to detect these $t_0$ pulses and separate them from other signals transmitted to the surface of the earth. These detected $t_o$ pulses are shown in FIG. 2B. The detected $t_o$ pulses are applied to 2 divide-by-four counter 18 which counts the $t_p$ pulses to a maximum of four and then resets itself. A logic circuit 19 is responsive to the output of the individual flip-flops making up the counter 18 for producing discrete signals representing the above-discussed four cycles of operation. Thus, each $t_o$ pulse applied to the divide-by-four counter 18 signals the start of a new cycle of operation.

The transmitted acoustic signals from the well tool 10 are also applied to a cement bond log amplitude circuit 24 which also receives selected ones of the detected $t_o$ pulses from the $t_o$ detector 17 via an AND gate 25. These gated $t_o$ pulses are selected as a timing source to enable the amplitude of the first half cycle of the acoustic energy received by the near receiver $R_1$ to be measured. The details of the CBL amplitude circuit 24 can be found in the above-mentioned Gollwitzer U. S. Pat. No. 3,340,955 and need not be discussed further here. The CBL amplitude circuit 24 produces an output signal whose amplitude is proportional to a time average value of the amplitude of the first energy arrival at the near receiver $R_1$. This output signal is applied to the recorder 21 to produce a cement bond log. The record medium (film) of recorder 21 is driven as a function of well tool movement by a rotating shaft 23. The shaft 23 is driven by a wheel 22 in engagement with the cable 14.

As discussed earlier, a cement bond log by itself may not always give the complete answer to the condition of the cement bonding. Thus, with the apparatus of FIG. 1, a variable density log of the complete wave train of acoustic energy arriving at the far receiver $R_2$ is also produced by the apparatus of FIG. 1 simultaneously with the making of the cement bond log.

To accomplish this simultaneous production of both cement bond and variable density logs with the same system and first concerning the cement bond log, the cycle 2 and 4 output signals from logic circuit 19 are combined in an OR gate 26 and utilized to enable the AND gate 25 to pass the detected $t_o$ pulses to the CBL amplitude circuit 24. The gated $t_o$ pulses are illustrated in FIG. 2D. The CBL amplitude circuit 24 operates to open a gate a fixed time interval after each detected $t_o$ pulse to measure the amplitude of the first arrival as illustrated in FIG. 2E. Since the near receiver $R_1$ signal is transmitted to the surface of the earth only during cycles 2 and 4 and the CBL amplitude circuit 24 is energized only during cycles 2 and 4, it can be seen that the CBL amplitude circuit will only be responsive to signals from the near receiver $R_1$.

To produce the variable density log, the cycles 1 and 3 output signals from logic circuit 19 are combined in an OR gate 27 and applied to the input of an AND gate 28. The detected $t_o$ pulse from detector 17 comprises the other input to AND gate 28, the output thereof being connected to oscilloscope driving circuits 29. Thus, during cycles 1 and 3 the detected $t_o$ pulse is applied to oscilloscope driving circuits 29. These gated $t_0$ pulses are shown in FIG. 2C. The cable signal from conductor 16 is also applied to the oscilloscope driving circuits 29.

Each detected $t_o$ pulse during cycles 1 and 3 is utilized by the oscilloscope driving circuits 29 to cause a horizontal sweep voltage to be generated for application to the horizontal sweep input of an oscilloscope 30. After some processing by the oscilloscope driving circuits 29, the cable signal from conductor 16 is applied to the intensity input of the oscilloscope 30 such that the sweeping electron beam will be varied in intensity as a function of the signal amplitude of the incoming cable signal. The details of the oscilloscope driving circuits 29 are shown in greater detail in copending application Ser. No. 829,159, filed by Theodore F. Brunn on May 26, 1969.

The face of the oscilloscope 30 adjoins the recorder 21 so as to produce a variable density log on the film within the recorder 21. Since the film moves as a function of the movement of the well tool, each sweep across the face of the oscilloscope 30 produces a line at a different location on the film to thereby produce a raster which, when complete, gives a variable density log. An example of such a variable density log is shown in track 1 of the log presentation of FIG. 4. Track 2 illustrates a typical cement bond log.

By producing both a cement bond log and variable density log with the apparatus of FIG. 1, the quality of a cement job can be readily and accurately determined. However, as discussed earlier, the eccentricity of the well tool 10 may cause erroneous logs to be produced. To circumvent this problem in accordance with the present invention, the travel time $\Delta t$ for acoustic energy to pass from the transmitter T to the near receiver $R_1$ is measured and recorded. Any eccentricity of the well tool will then show up on the recorded $\Delta t$ log as a $\Delta t$ variation.

To accomplish this result in the system of FIG. 1, certain signals derived from the $t_o$ detector 17, as well as the transmitted signals on conductor 16, are applied to a $\Delta t$ computing circuit 20 which operates to compute the travel time for the transmitted acoustic energy to pass from the transmitter T to the acoustic receiver $R_1$. The computed $\Delta t$ signal is then recorded by the recorder 21 as a function of well bore depth.

Within the $\Delta t$ computing circuit 20, the detected $t_o$ pulses are used as a timing aid to detect each first energy arrival at the receivers $R_1$ and $R_2$. This detected first energy arrival is designated $T_x$. These $t_o$ and $T_x$ pulses can be used to obtain a measure of the formation acoustic travel time. In one desirable manner, this is accomplished by subtracting the time interval which it takes an acoustic wave to travel from the transmitter T to the near receiver $R_1$, from the time for travel from the transmitter T to the far receiver $R_2$. As shown in U. S. Pat. No. 3,257,639 granted to F. P. Kokesh on June 21, 1966, a system having a 2 transmitter-2 receiver transducer array and utilizing 4 cycles of operations is especially suitable for such $\Delta t$ logging. To enable utilization of the Kokesh 4 cycle $\Delta t$ computing system with the apparatus of the present invention, the receiver identification logic circuits act to produce a four cycle operation though only two cycles, in fact, exist.

To explain how this is accomplished refer to FIG. 3 which shows the $\Delta t$ computing circuit of FIG. 1 in greater detail. The trailing edge of a pulse from the $t_o$ detector 17 (this pulse corresponds timewise with the detected $t_o$ pulse) energizes the divide-by-four counter 18 which changes state for each detected $t_o$ pulse up to a maximum count of four and then resets to zero. The logic circuit 19 is responsive to the output signals from the flip-flops of the divide-by-four counter 18 for producing an output signal on one of four output conductors depending on the state of the counter 18.

Now concerning how the measurement of $\Delta t$ takes place, each detected $t_o$ pulse energizes a delay one-shot 30 whose pulse trailing edge energizes a "$T_x$ gate one-shot" 31 to enable a "$T_x$ gate" 32. The delay time of the delay one-shot 30 is selected to place the output pulse from the one-shot 31 in timewise coincidence with the reception of a selected amplitude excursion of the acoustic receiver signal. A $T_x$ detector 33, e.g., a Schmitt trigger, produces an output pulse in response to each detected $T_x$ pulse for resetting a "clock gate control flip-flop" 34. This flip-flop 34 is set by each detected $t_o$ pulse from the $t_o$ detector 17 and thus the normal output of this flip-flop 34 will be at the "1" level for the time interval between each detected $t_o$ pulse and the next subsequent $T_x$ pulse. The normal output of this clock gate control flip-flop 34 enables a "clock gate circuit" 35 to pass a plurality of high frequency clock pulses from a clock source 36 to a binary counter 37 such that a binary number will be entered into the binary counter 37 proportional to the travel time of acoustic wave between the transmitter T and one of the receivers.

Cycles 1 and 3 correspond to the far receiver $R_2$ and cycles 2 and 4 correspond to the near receiver $R_1$. Thus to insure that the binary counter 37 ends up with a net positive count, the cycle 1 and 3 output signals from the logic circuit 19 are applied via an OR gate 38 to the "add command" input of the binary counter 37 and the cycle 2 and 4 output signals are applied via an OR gate 39 to the "subtract command" input of the binary counter 37.

At the end of cycle 4, a pulse (corresponding timewise with the detected $t_o$ pulse) from the $t_o$ detector 17 is combined in an AND gate 40 with the cycle 4 output signal from the logic circuit 19 to cause a "counter transfer one-shot" 41 to energize a plurality of "counter transfer gates" (AND gates) 42 after suitable time delay provided by a "counter transfer delay one-shot" 43. The resulting binary number is stored in a buffer memory 44 for use by a binary-to-analog converter 45 to produce an analog signal proportional to the acoustic travel time $\Delta t$. The trailing edge of this counter transfer pulse from one-shot 41 energizes a "counter reset one-shot" 48 via an OR gate 47. The one-shot 48 generates a pulse to reset the counter 37 after its contents have been transferred. As discussed in further detail later, the counter 37 is also reset by the $T_x$ pulse during sequence 3.

In the above-mentioned Kokesh patent, there are enough transmission channels (i.e., cable conductors) available such that the surface and downhole electronics can remain in synchronism with the particular cycle, i.e., the output signals from the logic circuit 19 in this Kokesh patent would be supplied in one form or another to the downhole electronics to keep it informed as to what cycle the surface apparatus is currently operating in. However in the present system, only one transmission channel is available and thus it is not possible for the surface and downhole electronics to remain synchronized on the same cycle of operation in this manner. To solve this problem, a zero detector 46 is responsive to the output signals from the various stages of the binary counter 37 for detecting when the binary counter 37 reaches a state of zero net count. This zero detector 46 could take the form of an OR gate responsive to the normal output of each flip-flop in the binary counter 37 for producing a "0" output whenever all stages of the counter 37 are "0". This negative going signal from the zero detector 46 is utilized to reset the divided-by-four counter 18 to its proper state. The reason why this is possible is due to the fact that, except for the programmed resets of counter 37, the only time that the counter should have a net count of "0" is when the cycles are reversed such that the counter is counting up during the near receiver cycle of operation and down during the far receiver cycle of operation. If the cycles are reversed, the counter will pass through zero during cycles 2 and 3 and it is checked for synchronization during cycle 3.

To prevent the divide-by-four counter 18 from being erroneously reset during cycles 1, or 4, diodes 50, and 52 are connected from the cycles 1 and 4 outputs of logic circuit 19 to the reset input of counter 18 to prevent its reset during any cycle other than cycle 2.

As discussed earlier, the eccentricity of the well tool may cause errors to show up in the cement bond and variable density logs. To enable detection of such eccentricity, the apparatus of the present invention operates to measure the acoustic travel time $\Delta t$ between the transmitter T and near receiver $R_1$. To this end, in FIG. 3, the $t_o$ pulse is utilized to energize the counter reset one-shot 48 for resetting the binary counter 37 during sequence 3. Thus, the $t_o$ pulse and sequence 3 signal are combined in an AND gate 49 whose output is connected to one input of the OR gate 47.

Summarizing the operation of the FIG. 3 system, the counter 37 is made to count up during cycles 1 and 3 and down during cycles 2 and 4 by virtue of the operation of the divide-by-four counter 18, logic circuit 19, and gates 38 and 39 steering the binary counter 37. After the counter 37 has counted up and down during cycles 1 and 2, the system checks to determine if the surface electronics is synchronized with the downhole electronics. If, at the end of cycle 2, the contents of counter 37 are negative (signifying an out of synchronization condition), the counter 37 will cross zero while counting down during sequence 2. The zero detector 46 will detect this zero crossing and reset the counter 18 to its proper state.

At the end of the counting period of cycle 3, the $t_o$ pulse causes the counter 37 to be reset via gates 49 and 47 and one-shot 48. With the counter 37 set to zero, everything is ready for the $\Delta t$ measurement for the transmitter T to the near receiver $R_1$ to be made during cycle 4. Thus, the clock gate 35 is opened for the time interval between the $t_o$ and $T_x$ pulses of cycle 4 to thereby register a count proportional to the acoustic travel time between the transmitter T and near receiver $R_1$. At the end of cycle 4, the data is transferred to the buffer memory 44 and binary-to-analog converter 45 for application to the recorder and the binary counter 37 is reset in readiness for another 4 cycles of operation.

Referring now to FIG. 4, there are shown examples of a variable density log, cement bond log and $\Delta t$ log. As discussed earlier, the variable density and cement bond logs can be used in conjunction to enable accurate interpretation of the cement conditions. The $\Delta t$ log is used to help determine the reliability of the other logs. Thus, at 5030–5045 feet, the cement bond log shows an amplitude increase and thus, perhaps, a bad cement job. However, the $\Delta t$ log shows a corresponding increase thus indicating eccentricity of the well tool over the same depth interval. Therefore, the cement bond log and perhaps also the variable density log should be questioned over this interval.

In addition to the arrangement of FIG. 1, the simultaneous production of both a cement bond log and variable density log could be accomplished with other systems. For example, the acoustic logging system shown and described in the above-mentioned Kokesh patent could also be used in modified form for this purpose. A modification of the Kokesh system to enable simultaneous production of both a cement bond log and variable density log is shown in the copending Grijalva application. To modify the Kokesh system to produce a transmitter to near receiver $\Delta t$ log, referring to FIG. 3, it is only necessary to combine the sequence 2 output signal from the logic circuit 19, as represented by the dashed line 55, with the sequence 4 signal in an OR gate 56 and disconnect the conductors at the outputs of zero detector 46, OR gate 38, and AND gate 49, as represented by the dashed X's 57, 58 and 59. By so doing, the binary counter 37 will register $\Delta t$ counts during cycles 2 and 4 only and these counts will only be transferred at the end of cycles 2 and 4. If desired, the output of OR gate 39 could be connected to the ADD steering input of counter 37 so that the count will always be positive or, if desired, a polarity inverter could be connected to the output of the ripple filter 60 to provide a positive signal output.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for investigating the media forming a cased well bore which has cement located between a casing and formation, comprising:

a well tool having at least one acoustic transmitter and at least two acoustic receivers spaced therefrom at different distances;

means for repetitively energizing said acoustic transmitter to emit energy into the media surrounding said well tool and producing timing pulses representative of the times of energization, at least a portion of said energy being received by said acoustic receivers which produce electrical signals representative of said received energy;

means responsive to selected timing pulses for measuring the amplitude of a selected portion of the signal produced by the receiver nearest said transmitter in response to acoustic energy transmitted to said receiver at least in part along the casing to produce an output signal representative of the bonding between the casing and cement surrounding said casing;

means responsive to selected timing pulses and selected signals produced by the receiver farthest from said transmitter in response to acoustic energy transmitted to said receiver at least in part through the formation surrounding the casing for producing a variable density display of the signals produced by said farthest receiver;

means responsive to selected timing pulses and selected signals produced by the receiver nearest said transmitter in response to acoustic energy transmitted to said receiver at least in part along the casing for measuring the travel time of said energy between said transmitter and near receiver along the casing to produce an output signal representative of said travel time; and recording means for producing a record of said cement bonding and travel time representative output signals and said variable density display to thereby enable a determination of the bonding of cement to a casing and formation.

2. Apparatus for investigating the media forming a cased well bore, said cased well bore having cement located between a casing and earth formations, comprising:

a well tool having an acoustic transmitter and two acoustic receivers spaced therefrom at different distances;

means for repetitively energizing said acoustic transmitter to emit energy into the media surrounding said well tool and producing timing pulses representative of the time of energization, at least a portion of said energy being received by said acoustic receivers which produce electrical signals representative of said received energy;

means operative in a time relationship with each emission of energy for selecting the electrical signal from one of said receivers for each energy emission for transmission to the surface of the earth;

means for transmitting said selected electrical signals and timing pulses to the surface of the earth;

control means located at the surface of the earth for producing control signals representative of which receiver signal has been selected;

means adapted for measuring the amplitude of a selected portion of a signal produced by one of said receivers in response to acoustic energy transmitted to said receiver at least in part along the casing to produce an output signal;

variable density means adapted to produce a variable density display of the signals produced by the other of said receivers in response to acoustic energy transmitted to said receiver at least in part through the formation surrounding the casing;

computing means adapted for computing the time interval between selected timing pulses and receiver signals produced by the said one receiver in response to acoustic energy transmitted along the casing to produce an output signal representative of the acoustic velocity of the media forming a cased well bore;

means responsive to said control signals for gating said timing pulses to said amplitude and computing means during selected time periods when a signal produced by the receiver nearest said transmitter is selected for transmission to the surface of the earth and for gating said timing pulses to said variable density means during selected time periods when a signal produced by the receiver farthest from said transmitted is selected for transmission to the surface of the earth, said gated timing pulses acting to enable the operation of said selected amplitude means and computing means or of said variable density means; and means for recording said amplitude and velocity representative output signals and variable density display to produce logs indicative of the bonding of the cement to the casing and formations.

3. Apparatus for investigating the media forming a cased well bore which has cement located between a casing and formation, comprising:

a well tool having at least one acoustic transmitter and at least two acoustic receivers spaced therefrom at different distances;

means for repetitively energizing said acoustic transmitter to emit energy into the media surrounding said well tool and producing timing pulses representative of the times of energization, at least a portion of said energy being transmitted along the casing and received by said acoustic receivers which produce electrical signals representative of said portion of said received energy;

means operative in a time relationship with each emission of energy for selecting the signals produced by one of said receivers for each energy emission for transmission to the surface of the earth;

means for transmitting said timing pulses and selected electrical signals to the surface of the earth;

control means located at the surface of the earth and responsive to said timing pulses for producing control signals representative of which receiver signal has been selected for transmission during any given time period;

means responsive to said timing pulses and receiver signals for producing output signals representative of the time separation between each timing pulse and the subsequent receiver signal;

accumulating means responsive to said output signals and control signals for adding representations of those output signals corresponding to travel time of said energy along the casing to the far receiver and subtracting representations of those output signals corresponding to travel time of said energy along the casing to the near receiver;

reset means responsive to at least one of said control signals and the accumulated state of said accumulating means for resetting said control means to the proper state if said accumulating means passes through zero net accumulation; and output means responsive to at least one of said control signals for resetting said accumulating means to a reference state and producing an output signal representative of the travel time of said energy along said casing between said transmitter and said near receiver.

4. The apparatus of claim 3 wherein said control means generates control signals corresponding to four different cycles of operation, two non-successive cycles corresponding to the time period during which said far receiver signal is selected for transmission to the surface of the earth and two non-successive cycles corresponding to the time period during which said near receiver signal is selected for transmission; wherein said accumulating means is responsive to said control signals for alternately adding and subtracting representations of the travel times of said energy along the casing from said transmitter to each of said receivers in turn; and wherein said reset means is operative in response to at least some control signals to check the state of said accumulating means for resetting said control means after said accumulating means has both added and subtracted at least once; and wherein said output means is responsive to at least some control signals for resetting said accumulating means prior to said accumulating means operating to accumulate a representation of said near receiver travel time and reading the contents of said accumulating means after said last named accumulation whereby said output signal will be representative of only the travel time of acoustic energy along the casing from said transmitter to said near receiver.

5. Apparatus for investigating the media forming a cased well bore which has cement located between a casing and formation, comprising:

a well tool having at least one acoustic transmitter and at least two acoustic receivers spaced therefrom at different distances;

means for repetitively energizing said acoustic transmitter to emit energy into the media surrounding said well tool and producing timing pulses representative of the times of energization, at least a portion of said energy being received by said acoustic receivers which produce electrical signals representative of said received energy;

means operative in a time relationship with each emission of energy for selecting the signals produced by one of said receivers for each energy emission for transmission to the surface of the earth;

means for transmitting said timing pulses and selected electrical signals to the surface of the earth;

control means located at the surface of the earth and responsive to said timing pulses for producing control signals representative of which receiver signal has been selected for transmission during any given time period;

means responsive to said timing pulses and receiver signals for producing a burst of clock pulses the number of which is representative of the time separation between each timing pulse and the subsequent receiver signal;

counting means responsive to said burst of clock pulses and control signals for adding those clock pulses whose number corresponds to the travel time to the far receiver and subtracting those clock pulses whose number corresponds to the travel time to the near receiver;

reset means responsive to at least one of said control signals and the accumulated state of said counting means for resetting said control means to the proper state if said counting means passes through zero net count; and output means responsive to at least one of said control signals for resetting said counting means to a reference state prior to the application of clock pulses corresponding to near receiver travel time to said counting means and producing an output signal representative of the travel time between said transmitter and said near receiver.

6. A method of investigating the media forming a well bore which has cement located between a casing and formation, comprising:

moving a well tool having at least one acoustic transmitter and at least two acoustic receivers spaced therefrom at different distances through a well bore;

repetitively energizing said acoustic transmitter to emit energy into the media surrounding said well tool and producing timing pulses representative of the times of energization, at least a portion of said energy being transmitted along the casing and received by said acoustic receivers which produce electrical signals representative of said received energy;

in response to selected timing pulses measuring the amplitude of a selected portion of the signal produced by the receiver nearest said transmitter in response to the portion of said energy transmitted to said receiver along the casing to produce an output signal representative of the bonding between the casing and cement surrounding said casing;

selecting given timing pulses and signals produced by the receiver farthest from said transmitter and using such selected pulses and signals to produce a variable density display of the signals produced by said far receiver;

selecting given timing pulses and signals produced by the receiver nearest said transmitter in response to the portion of said energy transmitted to said receiver along the casing for use in measuring the travel time of said energy along the casing between said transmitter and near receiver to produce an output signal representative of said travel time, and producing a record of said bonding and travel time representative output signals and said variable density display to thereby enable a determination of the bonding of cement to a casing and formation.

7. A method of investigating the media forming a cased well bore which has cement located between a casing and formation, comprising:

moving a well tool having at least one acoustic transmitter and at least two acoustic receivers spaced therefrom at different distances through a well bore:

repetitively energizing said acoustic transmitter to emit energy into the media surrounding said well tool and producing timing pulses representative of the times of energization, at least a portion of said energy being transmitted along the casing and received by said acoustic receivers which produce electrical signals representative of said received energy;

selecting the signals produced by one of said receivers in response to the portion of said energy transmitted along the casing for each energy emission for transmission to the surface of the earth;

transmitting said timing pulses and selected electrical signals to the surface of the earth;

producing control signals representative of which receiver signal has been selected for transmission during any given time period;

measuring the time separation between each timing pulse and a subsequent receiver signal to produce measurements of the travel time of said energy along the casing;

subtracting representations of a measurement corresponding to travel time of said energy along the casing to one of said near or far receivers from representations of a measurement corresponding to travel time of said energy along the casing to the other of said receivers in response to at least some of said control signals to produce an accumulation output;

monitoring said accumulation output during at least one time period represented by at least one of said control signals for altering said control signals to properly indicate which receiver signal has been selected if said accumulation output assumes a predetermined state; and accumulating representations of a measurement corresponding to travel time of said energy along the casing from said transmitter to said near receiver and producing an output signal representative thereof.

* * * * *